United States Patent
Bowman et al.

(10) Patent No.: US 7,568,642 B2
(45) Date of Patent: *Aug. 4, 2009

(54) SINGLE MOTOR BLOWER

(75) Inventors: David J. Bowman, Charlotte, NC (US);
Frank Comer Burroughs, Waxhaw, NC (US); Joseph Chester Willingham, Sr., Elkin, NC (US); William Crockett Richardson, III, Harrisburg, NC (US); Mitchell Ray Smith, Ronda, NC (US)

(73) Assignee: U.S. GreenFiber, LLC, Charlotte, NC (US)

( * ) Notice: Subject to any disclaimer, the term of this patent is extended or adjusted under 35 U.S.C. 154(b) by 445 days.

This patent is subject to a terminal disclaimer.

(21) Appl. No.: 11/402,309

(22) Filed: Apr. 11, 2006

(65) Prior Publication Data
US 2007/0246584 A1    Oct. 25, 2007

(51) Int. Cl.
*B02C 23/20* (2006.01)
(52) U.S. Cl. ............ 241/60; 241/101.2; 241/605
(58) Field of Classification Search .......... 241/60, 241/101.2, 605; 406/66
See application file for complete search history.

(56) References Cited

U.S. PATENT DOCUMENTS

| | | | |
|---|---|---|---|
| 1,568,139 A | 1/1926 | Dewey | |
| 2,193,849 A | 3/1940 | Whitfield | |
| 2,262,094 A | 11/1941 | Burt | |
| 2,665,852 A | 1/1954 | Shively | 241/92 |
| 2,793,083 A | 5/1957 | Oetiker | 302/35 |
| 4,025,122 A | 5/1977 | Diemert | 302/49 |
| 4,151,962 A | 5/1979 | Calhoun et al. | 241/60 |
| 4,560,307 A | 12/1985 | Deitesfeld | 406/63 |
| 4,599,015 A | 7/1986 | Krambrock | 406/66 |
| 4,640,467 A | 2/1987 | Takeuchi | 241/152 |
| 4,661,024 A | 4/1987 | Hafner | 406/63 |
| 5,071,289 A | 12/1991 | Spivak | 406/11 |
| 5,511,730 A | 4/1996 | Miller et al. | 241/57 |
| 7,270,283 B2* | 9/2007 | Bowman et al. | 241/60 |

OTHER PUBLICATIONS

Krendl Machine Company Printout, copyright 1996, 3 pages.
Krendl Machine Company Printout, copyright Mar. 2005, 2 pages.
Krendl Machine Company Printout, copyright Jul. 2005, 2 pages.
Krendl Machine Company Printout, www.krendlmachine.com, Choosing the Right Equipment, copyright 2006, 2 pages.
Machine Operators Manual Printout, Regal Industries Predator II Cellulose Blowing Machine, undated, 5 pages.

* cited by examiner

*Primary Examiner*—Mark Rosenbaum
(74) *Attorney, Agent, or Firm*—MacCord Mason PLLC

(57) ABSTRACT

An apparatus for installation of a material having discrete elements. The apparatus includes a supply material having discrete elements and a transporter system downstream of the supply material having discrete elements. In embodiments, the transporter system includes: a high speed, inline blower; a material agitator upstream of the inline blower, the material agitator including a plurality of concentric rings with serrations on the upper surface of each arm, wherein at least one outer ring includes saw tooth serrations on the upper surface of the ring; a transmission connected to the shaft of the blower for providing a lower speed mechanical output to the material agitator; and an orifice substantially adjacent to the inlet of the blower for receiving the supply material having discrete elements. In embodiments, the apparatus further includes an applicator assembly connected downstream to the transporter system.

56 Claims, 8 Drawing Sheets

SINGLE MOTOR BLOWER

BACKGROUND OF THE INVENTION (1) Field of the Invention

The present invention relates generally to an apparatus for installation of a material having discrete elements, and, more particularly, to a transporter system including a high speed, inline blower, a material agitator upstream of the inline blower, a transmission connected to the shaft of the blower for providing a lower speed mechanical output to the material agitator and an orifice substantially adjacent to the inlet of the blower for receiving the supply material having discrete elements.

(2) Description of the Prior Art

Insulation is used in residential and commercial dwellings both to conserve energy and to reduce noise. The two most common types of insulation are blown and batt. Loose fill insulation, unlike batt insulation, requires the use of a machine to open the product in baled or compressed form. Opening in the industry commonly refers to modifying a product of a relatively high packaged density to a much lower installed density, perhaps as much as only 5-10% of the initial packaged density. The opened insulation is then conveyed to the final installation location through an air conveyance system. The finished installation is accomplished in several ways depending on final product needs.

One method for opening and conveying the product is to provide a rotational insulation opening device in a hopper in the machine to prepare the product for further transport. The semi-opened insulation materials is then gravity fed into the top cavity of an airlock, a horizontally rotating device that segregates portions of the material, and then rotates it into contact with a air stream created by a air blower pump. Typically, these devices are run by separate motors, creating added machine weight both for the motors, and for all the support brackets, control electrical controls and other associated hardware. The airlock also adds significant weight to the machine.

Airlock based machines typically have a horizontally oriented cylinder with a longitudinal opening in the top for the gravity fed and/or mechanical introduction of insulation material. The cylinder is divided longitudinally into a plurality of chambers by a rotating series of blades or paddles. The blades or paddles seal off the inner dimensions of the airlock cylinder creating discrete chambers that are sealed from each other during rotation. The lower chamber of the cylinder has an opening at either end such that air from an air pump can be introduced into one end of the cylinder and can exit the other end, carrying with it any insulation material that is in that particular chamber.

The effect of the airlock is to create a series of rotating chambers that sequentially accept insulation material that is gravity or force fed into the top chamber. As the material drops into the top chamber, the rotation of the blades or paddles carries the material away from the opening and seals the cavity in which the insulation now resides. When the chamber rotates to the other side of the cylinder, it comes into contact with the air stream provided by the air pump, and the insulation in just that cavity is blown out into the conveying hose to the installation location.

A problem with airlock-based insulation blowing machines is that material is gravity or mechanically fed into the top chamber of the cylinder, and then is conveyed directly into the conveying stream. If the product is not fully opened prior to entering the conveying stream, only the additional turbulence of the conveying hose can be used to further open the product to its design density. Thus, many if not all insulation hoses are internally ribbed to force increased agitation post-blower.

Yet another method is to provide for insulation opening and introduction into the conveying air stream, and use a through blower device where the insulation passes through the pumping vanes of the blower itself. Such machines are thought to increase the opening ratio of the density of the opened product as installed to the density of the packaged product. However, the available machines use two motors as well, either both enclosed in the machine housing, or with one motor detached from the machine during transit, and then reattached at the installation site. Either method increases the total machine weight, complexity, and electrical demands.

Also, through blower devices force the machine designer to compensate for the relatively smaller introduction cross section leading to the conveying stream of the pump by attempting to force increased product opening prior to air stream entrance of the insulation. This has created a limitation in standard practices such that only the very smallest of insulation machines currently use the through blower concept. Medium and large sized blowing machines use the airlock device and two or more motors to provide a high rate of material flow, but with a resulting sacrifice in achieving full product value.

Thus, there remains a need for an apparatus for installation of insulation materials that uses a through blower concept, is very light weight, and also fully opens the insulation materials so that the full value as created in the insulation manufacturing plant can be achieved.

SUMMARY OF THE INVENTION

The present invention is directed to an apparatus for installation of a material having discrete elements. The apparatus includes a supply material having discrete elements and a transporter system downstream of the supply material having discrete elements. In the preferred embodiment, the transporter system includes: (i) a high speed, inline blower; (ii) a material agitator upstream of the inline blower, the material agitator including a plurality of concentric rings with serrations on the upper surface of each arm, wherein at least one outer ring includes saw tooth serrations on the upper surface of the ring; (iii) a transmission connected to the shaft of the blower for providing a lower speed mechanical output to the material agitator; and (iv) an orifice substantially adjacent to the inlet of the blower for receiving the supply material having discrete elements. In the preferred embodiment, the apparatus further includes an applicator assembly connected downstream to the transporter system.

Preferably, the orifice is substantially adjacent to the inlet of the blower for receiving the supply material having discrete elements and is generally oval with its major axis substantially axially aligned to improve throughput.

In the preferred embodiment, the supply of material having discrete elements may be selected from the group consisting of fibrous material, granular material, pellet material and agglomerated material and mixtures thereof. The supply of material having discrete elements may be inorganic. Preferably, the inorganic material may be selected from the group consisting of fiberglass, rock wool, pearlite, mineral wool, and asbestos and mixtures thereof. Also, the supply of material having discrete elements may be organic. The organic material may be a natural material, and the natural material may be cellulosic. Also in the preferred embodiment, the supply of material having discrete elements may be a non-conductive material. The supply of non-conductive material may be a thermally non-conductive material or an acoustically non-conductive material. Also, the supply of non-conductive material may be an electrically non-conductive material.

In the preferred embodiment, the improved single motor blower includes a transmission. Preferably, the transmission provides about an 80:1 speed reduction.

Preferably, the inline blower may be a vertical feed blower. Also, the inline blower may include: a motor having a motor shaft extending through the motor; an impeller connected to one end of the motor shaft. The transmission may be connected between the other end of the motor shaft and the material agitator.

In the preferred embodiment, the speed of the motor can be maintained at greater than about 1500 rpm.

Also in the preferred embodiment, the impeller includes between about 3 and about 16 vanes.

In one embodiment, the material agitator further includes a base and a feed hopper attached to the base. The feed hopper may further include a shelf adjacent to its distal opening. Also, the feed hopper may be removable from the base. In one embodiment, the feed hopper further includes a proximity sensor for detecting the location of the feed hopper and providing a warning signal if the feed hopper is detached from the base. Preferably, the proximity sensor is positioned on the outer surface of the feed hopper.

Preferably, the gap between the concentric rings may be spaced to prevent material that is too large from passing into the next zone.

Also preferably, the material agitator may further include a feed hopper for receiving the material having discrete elements. The feed hopper may further include a breaker bar extending into the feed hopper. The breaker bar may further include a plurality of breaker bar vanes.

The feed hopper may include a plurality of spring loaded, roller bars located between the breaker bars and the concentric rings for assisting in opening the material having discrete elements.

Preferably, the speed of the material agitator may be less than about 100 rpm.

In the preferred embodiment, the agitator may further include a plurality of sweeper bars for sweeping material into the conduit.

Also preferably, the improved single motor blower may further include at least one air induction orifice adjacent to an inlet of the high speed, inline blower for providing a minimum airflow to reduce plugging.

In the preferred embodiment, the applicator assembly may be a conduit. The applicator assembly may further include a material nozzle. Preferably, the material nozzle may further include an injector system for activating an adhesive for bonding the supply material having discrete elements. The injector system may be water-based. The injector system may be substantially water-free.

Accordingly, one aspect of the present invention is to provide an apparatus for installation of a material having discrete elements, the apparatus comprising: (a) a supply material having discrete elements; and (b) a transporter system downstream of the supply material having discrete elements, the transporter system having (i) a high speed, inline blower; (ii) a transmission connected to the blower for providing a lower speed mechanical output; and (iii) an orifice substantially adjacent to the inlet of the blower for receiving the supply material having discrete elements.

Another aspect of the present invention is to provide a transport apparatus for an apparatus for installation of a material having discrete elements, the apparatus comprising: (a) a high speed, inline blower; (b) a material agitator upstream of the inline blower, the material agitator including a plurality of concentric rings with serrations on the upper surface of each arm, wherein at least one outer ring includes saw tooth serrations on the upper surface of the ring; and (c) a transmission connected to the shaft of the blower for providing a lower speed mechanical output to the material agitator.

Still another aspect of the present invention is to provide an apparatus for installation of a material having discrete elements, the apparatus comprising: (a) a supply material having discrete elements; (b) a transporter system downstream of the supply material having discrete elements, the transporter system having (i) a high speed, inline blower (ii) a material agitator upstream of the inline blower, the material agitator including a plurality of concentric rings with serrations on the upper surface of each arm, wherein at least one outer ring includes saw tooth serrations on the upper surface of the ring; (iii) a transmission connected to the shaft of the blower for providing a lower speed mechanical output to the material agitator; and (iv) an orifice substantially adjacent to the inlet of the blower for receiving the supply material having discrete elements; and (c) an applicator assembly connected downstream to the transporter system.

These and other aspects of the present invention will become apparent to those skilled in the art after a reading of the following description of the preferred embodiment when considered with the drawings.

DESCRIPTION OF THE PREFERRED EMBODIMENTS

Figure 1:
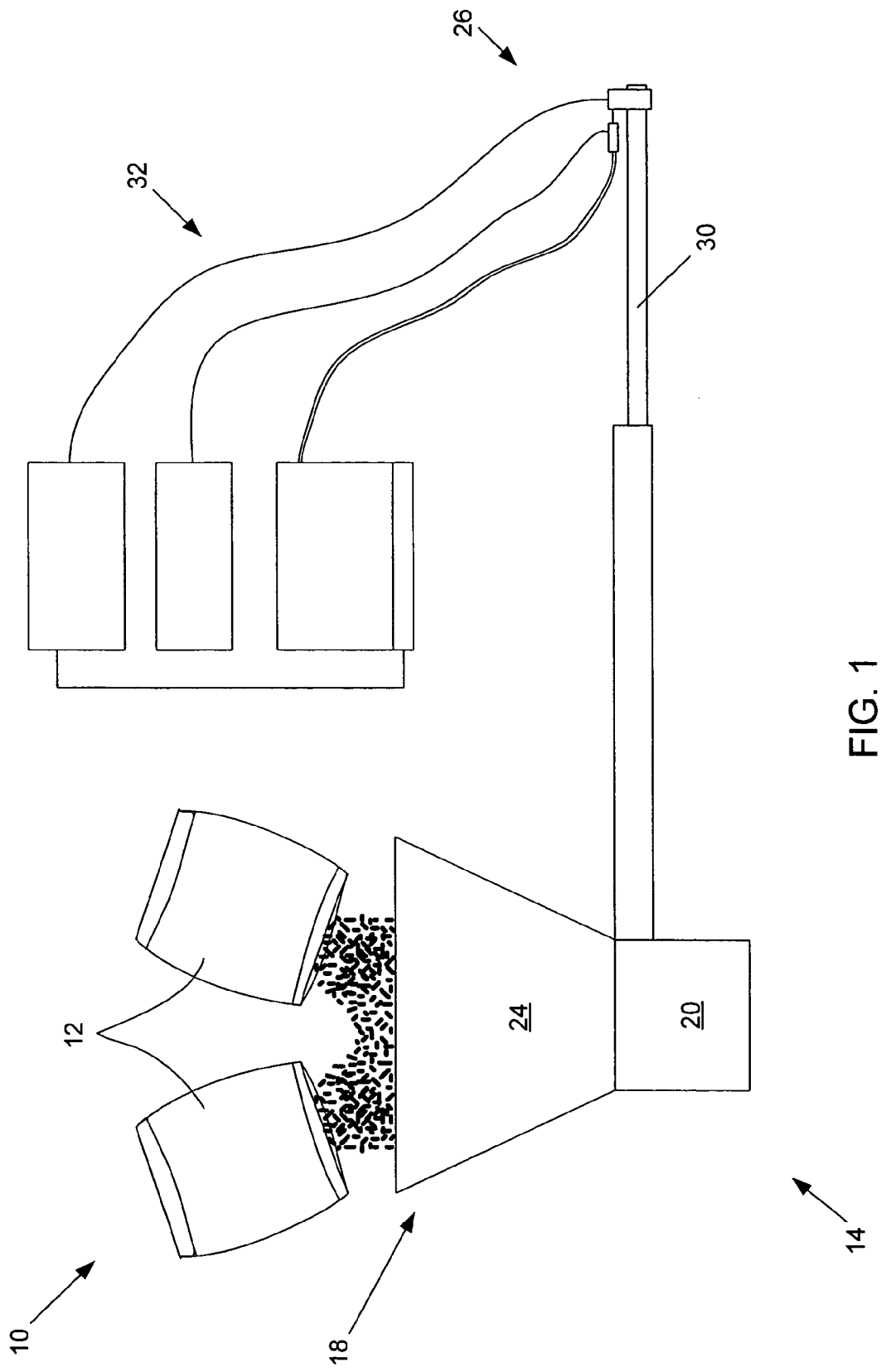
FIG. 1 is a schematic diagram of an apparatus for installation of a material having discrete elements constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing an embodiment of the invention and are not intended to limit the invention thereto. As best seen in FIG. 1, an apparatus for installation of a material having discrete elements, generally designated 10, is shown constructed according to the present invention. The apparatus 10 includes a supply of material having discrete elements 12 and a transporter system 14 downstream of the supply of material having discrete elements 12. The transporter system 14 includes a transport apparatus 18 including a high speed, inline blower 20. An applicator assembly 26 is connected downstream to the transporter system 14. The applicator assembly 26 is a conduit including a material nozzle 30. The material nozzle 30 includes an injector system 32 for activating an adhesive for bonding the supply material having discrete elements. The injector system 32 may be designed for water-based adhesive application, no adhesive application, or substantially water-free adhesive application.

The supply of material having discrete elements 12 may be selected from the group consisting of fibrous material, granular material, pellet material, and agglomerated material and mixtures thereof. The supply of material having discrete elements 12 may be inorganic. The inorganic material may be selected from the group consisting of fiberglass, rock wool, pearlite, mineral wool, and asbestos and mixtures thereof. The supply of material having discrete elements may be organic. The organic material may be a natural material. The natural material may be cellulosic. The supply of material having discrete elements 12 may be a non-conductive material. The non-conductive material may be a thermally non-conductive material. Also, the supply of non-conductive material may be an acoustically non-conductive material. The supply of non-conductive material may further be an electrically non-conductive material.

Figure 2:
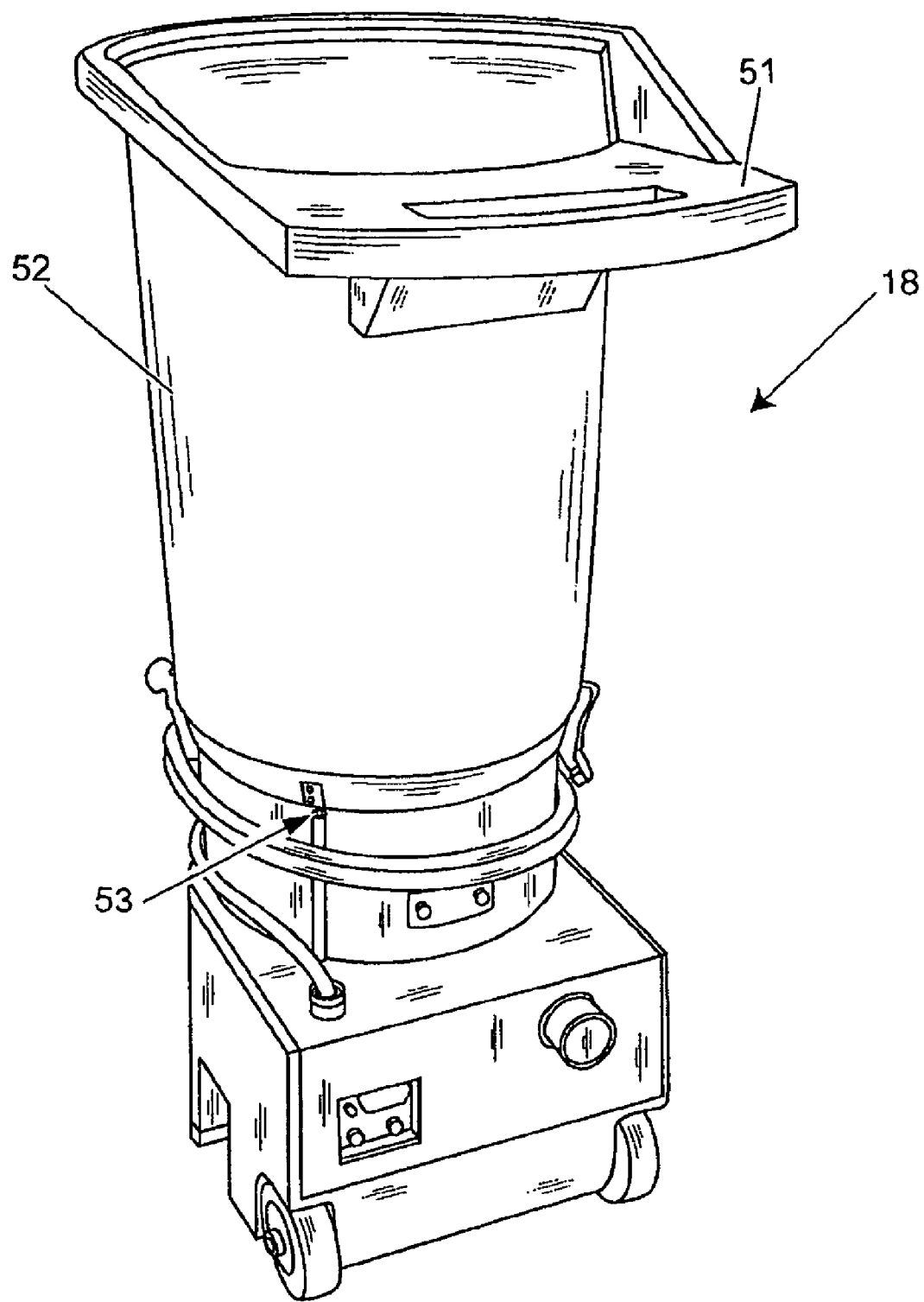
FIG. 2 is a perspective view of a transport apparatus for a system for installation of a material having discrete elements.

FIG. 2 is a perspective view of a transport apparatus 18 for a system for installation of a material having discrete elements. A feed hopper 52 may further include one or more of a shelf 51 adjacent to its distal opening and a proximity sensor 53 for detecting the location of the feed hopper and providing a warning signal if the feed hopper is detached from its base.

Figure 3:
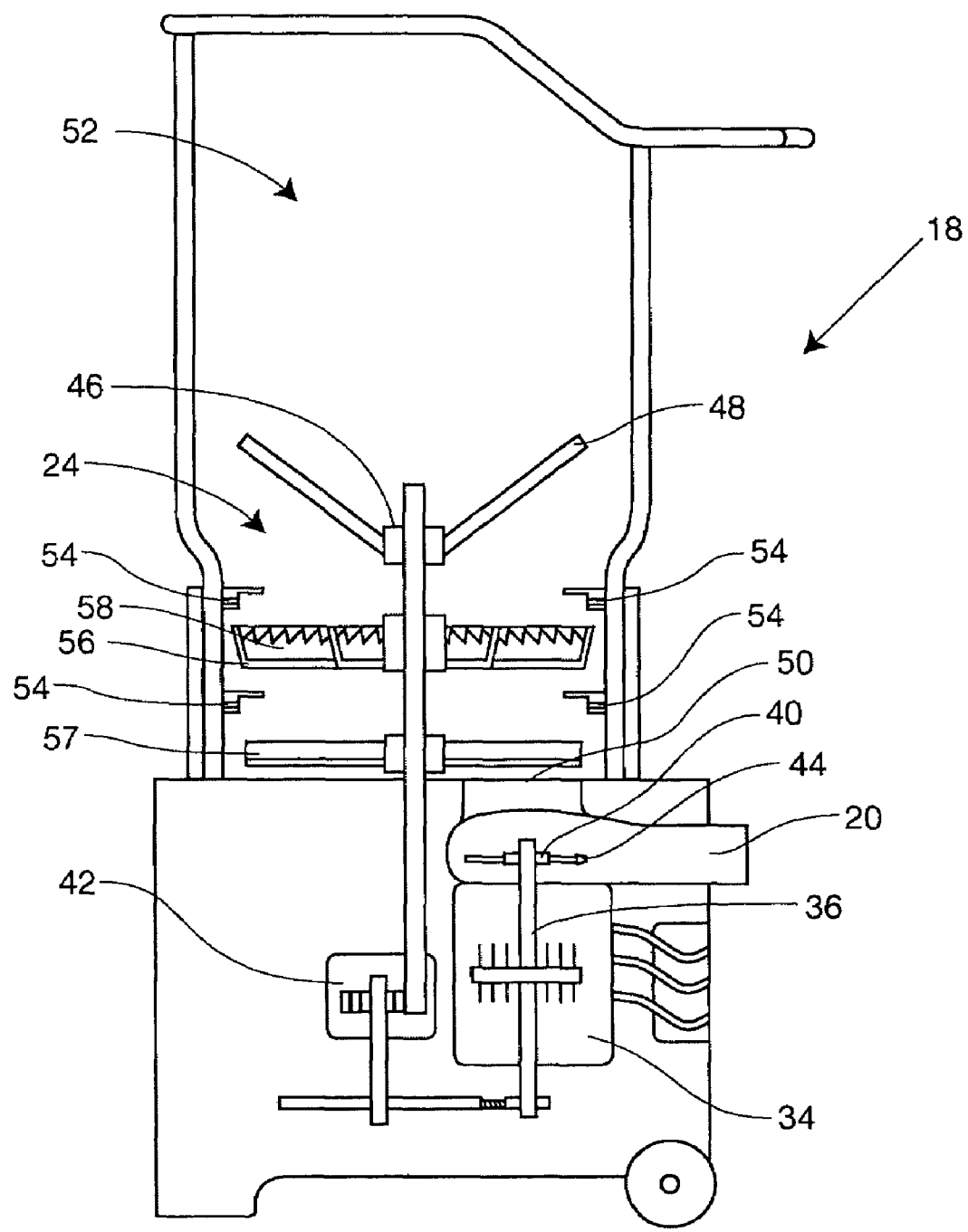
FIG. 3 is a schematic cross section of the transport apparatus.

FIG. 3 is a schematic cross section of the transport apparatus 18. The transport apparatus 18 includes a high speed, inline blower 20 and a material agitator 24 upstream of the blower 20. The blower 20 includes a motor 34 having a motor shaft 36 extending through the motor 34; an impeller 40 connected to one end of the motor shaft 36, and; a transmission 42 connected to the other end of the motor shaft 36 for connecting the inline blower 20 to the material agitator 24. In one embodiment of the apparatus, the speed of the motor 34 is maintained at greater than about 1500 rpm. The impeller 40 may include between about 3 and about 16 or more vanes 44. The transport apparatus 18 includes at least one air induction orifice 45 adjacent to the inlet of the blower 20 for providing a minimum airflow to reduce plugging. The transport apparatus 18 may weigh less than about 90 pounds. The transport apparatus 18 may weigh less than about 75 pounds. At least one roller bar 54 between a breaker bar 46 and concentric rings 56 may be included to assist in opening the material having discrete elements 12 prior to entering the spaces between the concentric rings 56.

Preferably, the feed hopper 52 includes a plurality of spring loaded, roller bars 54 located between the breaker bar 46 and the concentric rings 56 for assisting in opening the material having discrete elements. Sweeper bars 57 may be used to rotate around the agitator 24 to sweep material 12 into a conduit 50. In the preferred embodiment, the transmission 42 for providing a lower speed mechanical output to the material agitator 24 is connected to the shaft 36 of the blower 20 by a belt drive.

Also, the transmission 42 may include a low mass, balanced sprocket attached to the input of the transmission for reducing vibration and wear. The balanced sprocket may have 3-16 fan type spoke blades to improve airflow and motor/transmission cooling. Preferably, the axis of rotation of the transmission connected to the shaft of the blower and the axis of rotation of the shaft of the blower lie substantially in a plane and wherein the motor brushes of the blower are oriented substantially perpendicular to the plane.

In one embodiment, the material agitator further includes a base 48 and a feed hopper 52 attached to the base for receiving the material having discrete elements. Also, the feed hopper 52 for receiving the material having discrete elements may be removable from the base 48. In one embodiment, the feed hopper 52 further includes a proximity sensor 53 for detecting the location of the feed hopper and providing a warning signal if the feed hopper is detached from the base 48. Preferably, the proximity sensor 53 is positioned on the outer surface of the feed hopper 52.

Figure 4:
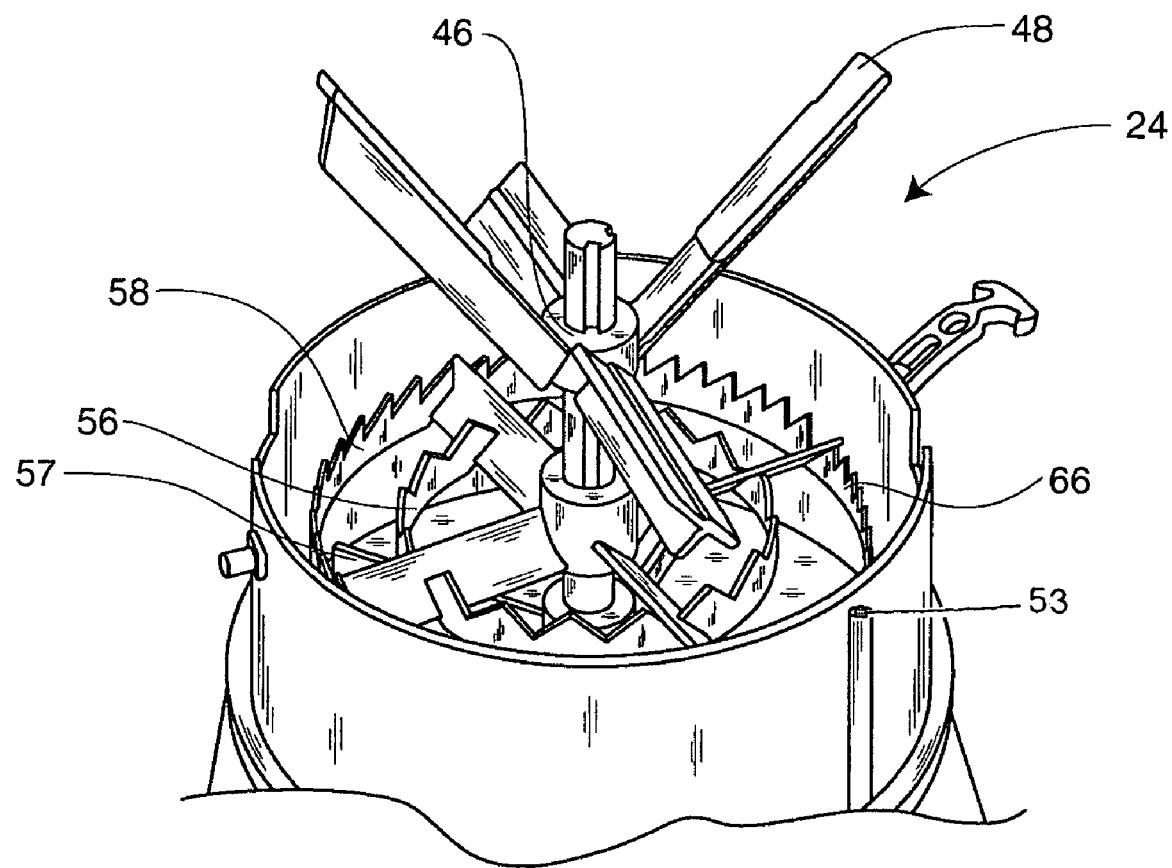
FIG. 4 is a top perspective view of a feed hopper and material agitator for a transport apparatus for a system for installation of a material having discrete elements.
Figure 5:
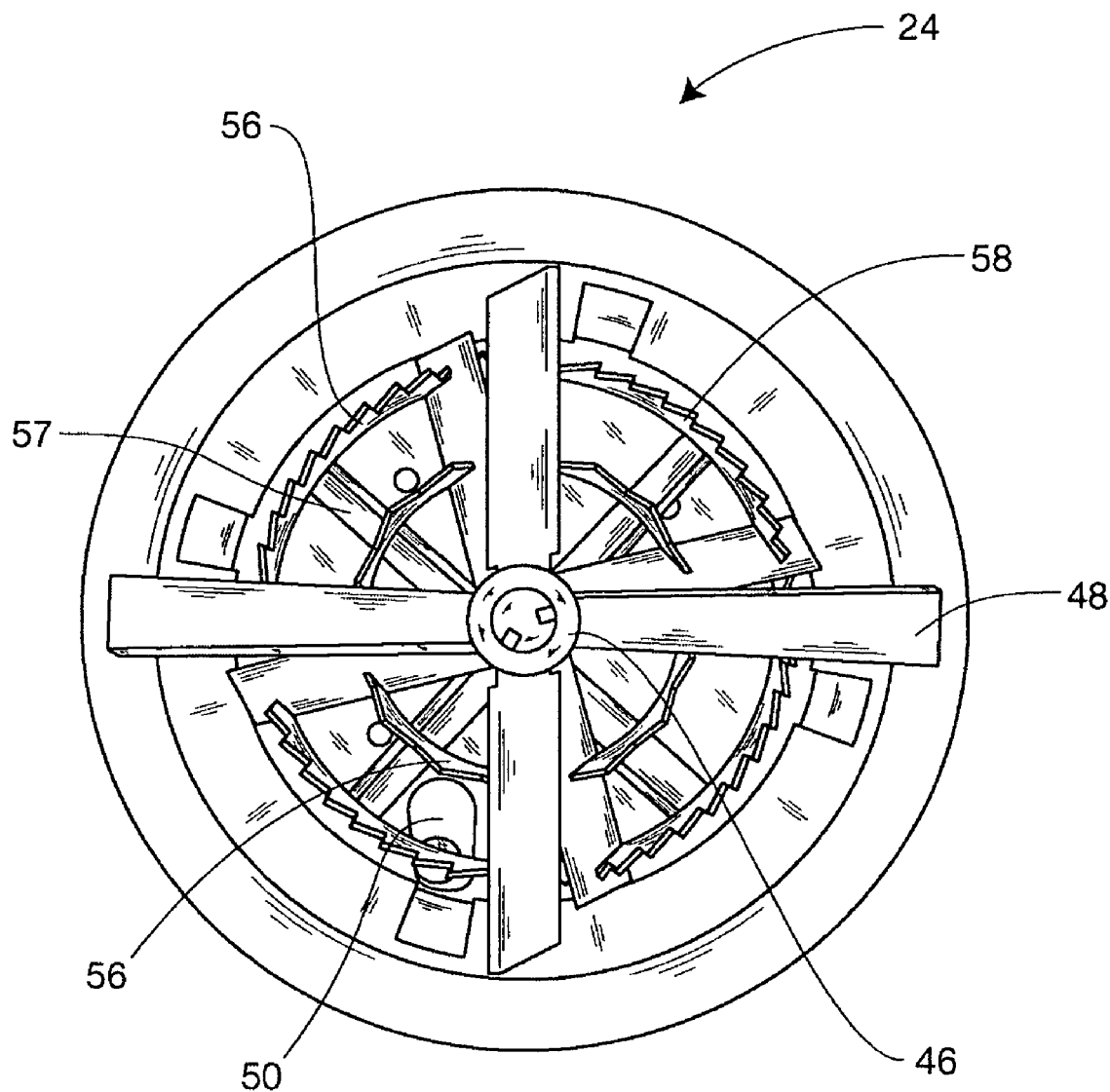
FIG. 5 is a top view of the feed hopper and material agitator.

FIG. 4 is a top perspective view and FIG. 5 is a top view of a feed hopper 52 and material agitator 24 for a transport system for an apparatus for installation of a material having discrete elements. The material agitator 24 includes concentric rings 56 with serrations 58 on top such that the gap between the concentric rings 56 can be controlled so as to prevent material 12 that is too large from passing into the next zone.

FIG. 5 shows an orifice 50 substantially adjacent to the inlet of the blower 20 for receiving the supply material having discrete elements that is generally oval with its major axis substantially axially aligned to improve throughput. In one embodiment, the feed hopper 52 includes at least one breaker bar 46 (also shown in FIGS. 3 and 4) extending into the feed hopper 52. The breaker bar 46 may include a plurality of breaker bar vanes 48.

Figure 6:
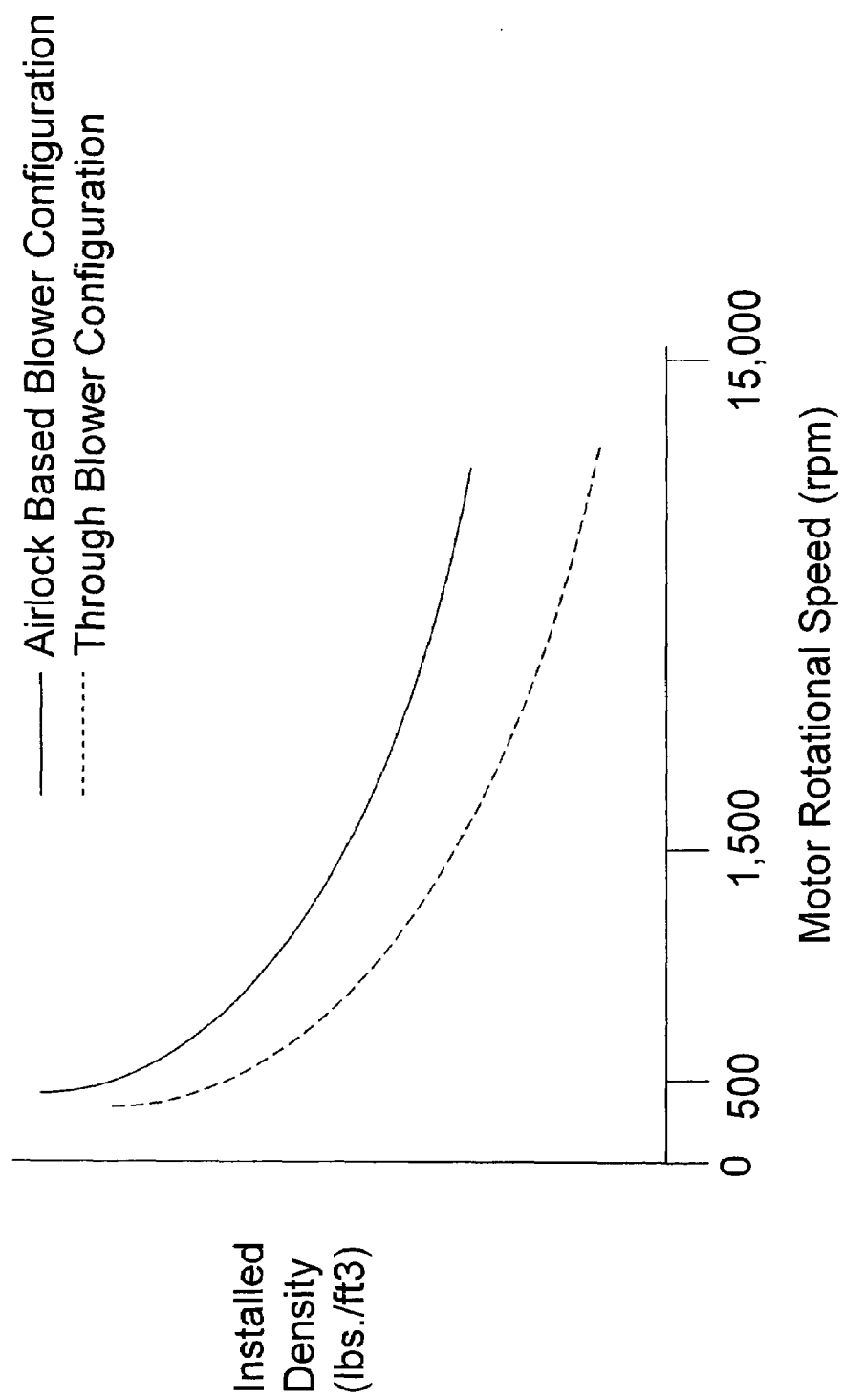
FIG. 6 is a graphical representation of the Installed Density of the Material Having Discrete Elements as a Function Blower Type and Rotational Speed using the apparatus for installation of a material having discrete elements.

FIG. 6 is a graphical representation of the Installed Density Level of the Installed Material Having Discrete Elements as a Function of the Speed of the Blower Motor using the apparatus for installation of a material having discrete elements. The installed density level is shown in pounds of material per cubic foot and the speed of the blower motor is shown from 500 to 15,000 revolutions per minute. The broken line in the graph represents density when blown in using a through blower type machine at a corresponding blower motor speed and the solid line represents the installed density of the material when blown in using a vertical feed airlock type blower machine at a corresponding blower motor speed.

Figure 7:
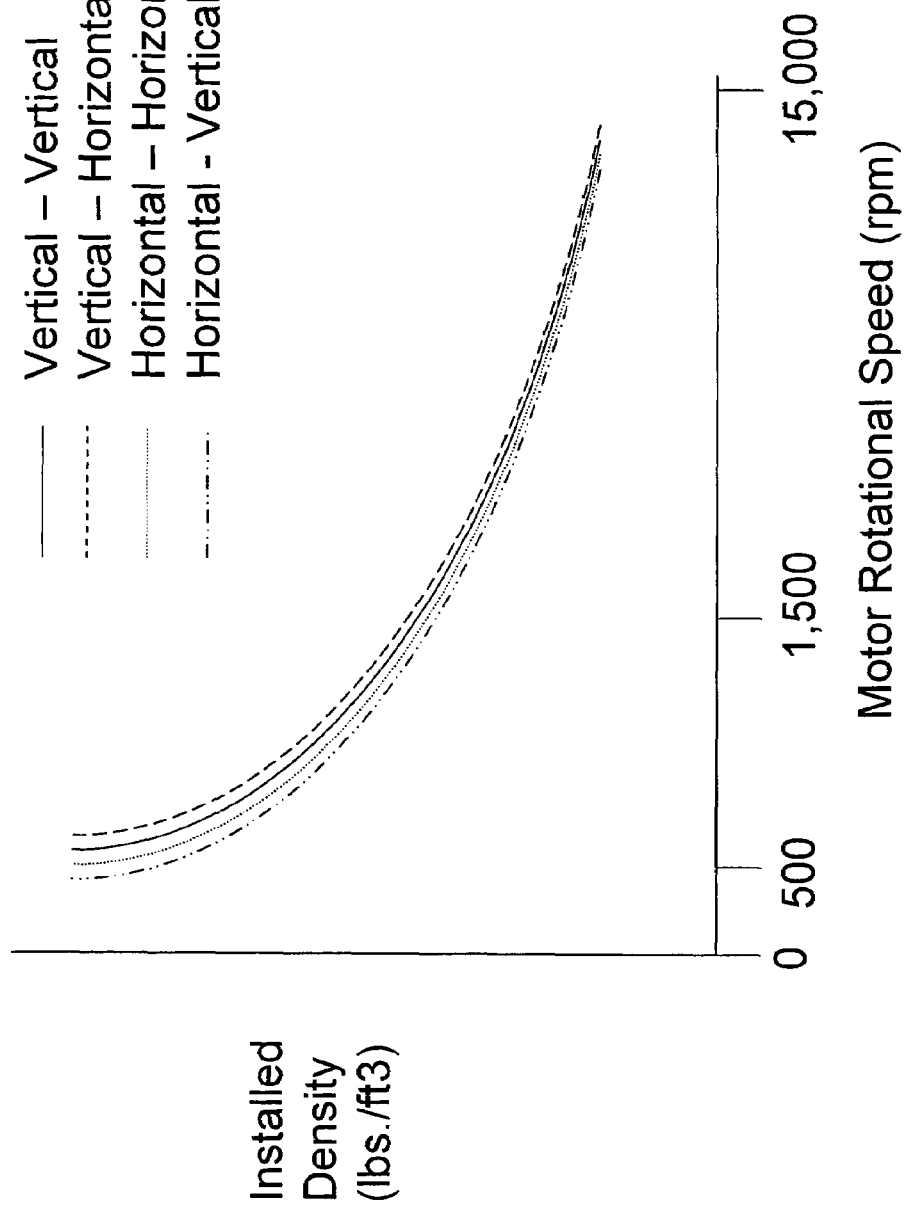
FIG. 7 is a graphical representation of the Function of Orifice Orientation of the Feed Hopped and Blower Intake to Installed Density when using a through blower apparatus for installation of a material having discrete elements.

FIG. 7 is a graphical representation of the Function of Orifice Orientation of the Feed Hopper and Blower Intake to Installed Density when using a through blower apparatus for installation of a material having discrete elements. The graph illustrates that with a through blower configuration, the orientation of the orifice in the feed hopper and the orifice of the blower intake can be any combination of orientations relative to each other, and the installed density of the material having discrete elements will be roughly the same. This is not true for an airlock machine, where only combinations where the first orientation is always vertical will allow material to move through the machine.

Figure 8:
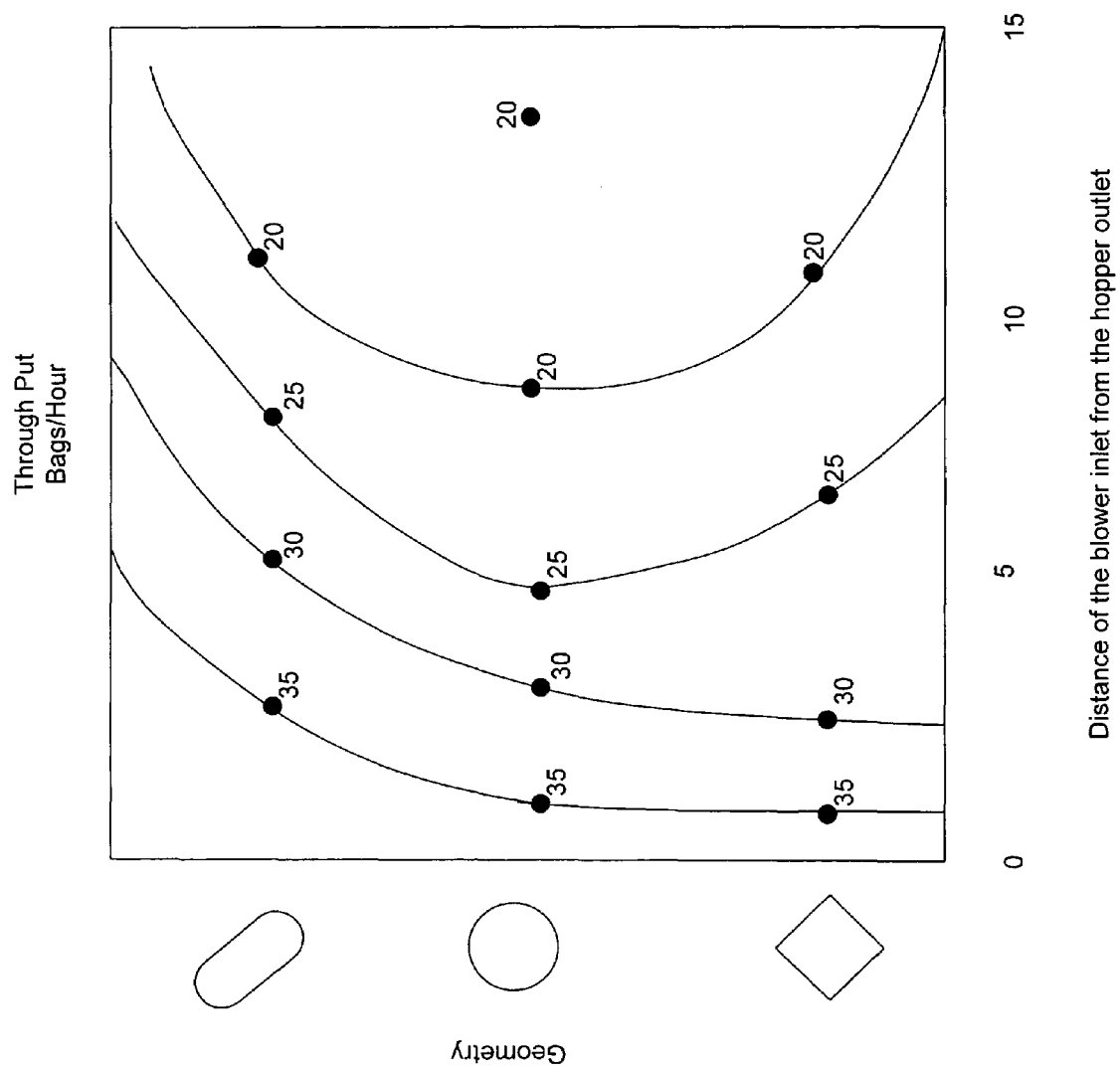
FIG. 8 is a graphical representation of the Function of Throughput (bags/hr) to Orifice Geometry and Distance of the Blower Inlet from the Hopper Outlet.

FIG. 8 is a graphical representation of the Function of Throughput (bags/hr) to Orifice Geometry and Distance of the Blower Inlet from the Hopper Outlet. As can be seen, throughput increases both as a function of decreasing distance between the blower inlet and the hopper outlet and as a function of orientation of the inlet.

Certain modifications and improvements will occur to those skilled in the art upon a reading of the foregoing description. By way of example, a fan can be installed inline to enhanced performance of an airlock machine. All such modifications and improvements have not been included herein for the sake of conciseness and readability but are properly within the scope of the following claims.

We claim:

1. A transport system for an apparatus for installation of a material having discrete elements, said apparatus comprising:
   (a) a high speed, inline blower;
   (b) a material agitator upstream of said inline blower, said material agitator including a plurality of concentric rings with serrations on the upper surface of each ring, wherein at least one outer ring includes saw tooth serrations on the upper surface of the ring; and
   (c) a transmission connected to the shaft of said blower for providing a lower speed mechanical output to said material agitator.

2. The apparatus according to claim 1, wherein said inline blower is a vertical feed blower.

3. The apparatus according to claim 1, wherein said inline blower includes: a motor having a motor shaft extending through said motor; an impeller connected to one end of said motor shaft; and said transmission is connected between the other end of said motor shaft and said material agitator.

4. The apparatus according to claim 3, wherein the speed of said motor can be maintained at greater than about 1500 rpm.

5. The apparatus according to claim 3, wherein said impeller includes between about 3 and about 16 vanes.

6. The apparatus according to claim 1, wherein the gap between the concentric rings is spaced to prevent material that is too large from passing into the next zone.

7. The apparatus according to claim 1, wherein said material agitator further includes a base and a feed hopper attached to said base for receiving the material having discrete elements.

8. The apparatus according to claim 7, wherein said feed hopper for receiving the material having discrete elements is removable from said base.

9. The apparatus according to claim 8, wherein said feed hopper further includes a proximity sensor for detecting the location of said feed hopper and providing a warning signal if the feed hopper is detached from said bases.

10. The apparatus according to claim 9, wherein said proximity sensor is positioned on the outer surface of said feed hopper.

11. The apparatus according to claim 7, wherein said feed hopper further includes a breaker bar extending into said feed hopper.

12. The apparatus according to claim 11, wherein said breaker bar further includes a plurality of breaker bar vanes.

13. The apparatus according to claim 11, wherein the feed hopper includes a plurality of spring loaded, roller bars located between the breaker bar and the concentric rings for assisting in opening the material having discrete elements.

14. The apparatus according to claim 7, wherein said feed hopper further includes a shelf adjacent to its distal opening.

15. The apparatus according to claim 1, wherein the speed of said material agitator is less than about 100 rpm.

16. The apparatus according to claim 1, wherein said agitator further includes a plurality of sweeper bars for sweeping material into the conduit.

17. The apparatus according to claim 1, further including at least one air induction orifice adjacent to the inlet for the material having discrete elements of said high speed, inline blower for providing a minimum air flow to reduce plugging.

18. The apparatus according to claim 1, wherein said transmission connected to the shaft of said blower for providing a lower speed mechanical output to said material agitator is connected by a belt drive.

19. The apparatus according to claim 18, wherein said transmission connected to the shaft of said blower for providing a lower speed mechanical output to said material agitator includes a low mass, balanced sprocket attached to the input of said transmission for reducing vibration and wear.

20. The apparatus according to claim 18, wherein the axis of rotation of said transmission connected to the shaft of said blower and the axis of rotation of the shaft of said blower lie substantially in a plane and wherein the motor brushes of said blower are oriented substantially perpendicular to said plane.

21. An apparatus for installation of a material having discrete elements, said apparatus comprising:
   (a) a supply material having discrete elements;
   (b) a transporter system downstream of said supply material having discrete elements, said transporter system having (i) a high speed, inline blower (ii) a material agitator upstream of said inline blower, said material agitator including a plurality of concentric rings with serrations on the upper surface of each arm, wherein at least one outer ring includes saw tooth serrations on the upper surface of the ring; (iii) a transmission connected to the shaft of said blower for providing a lower speed mechanical output to said material agitator; and (iv) an orifice substantially adjacent to the inlet of said blower for receiving the supply material having discrete elements; and
   (c) an applicator assembly connected downstream to said transporter system.

22. The apparatus according to claim 21, wherein said applicator assembly is a conduit.

23. The apparatus according to claim 22, wherein said applicator assembly further includes a material nozzle.

24. The apparatus according to claim 23, wherein said material nozzle further includes an injector system for activating an adhesive for bonding said supply material having discrete elements.

25. The apparatus according to claim 24, wherein said injector system is water-based.

26. The apparatus according to claim 24, wherein said injector system is substantially water-free.

27. The apparatus according to claim 21, wherein said supply of material having discrete elements is selected from the group consisting of fibrous material, granular material, pellet material and agglomerated material and mixtures thereof.

28. The apparatus according to claim 27, wherein the supply of material having discrete elements is inorganic.

29. The apparatus according to claim 28, wherein said inorganic material is selected from the group consisting of fiberglass, rock wool, pearlite, mineral wool, and asbestos and mixtures thereof.

30. The apparatus according to claim 27, wherein said supply of material having discrete elements is organic.

31. The apparatus according to claim 30, wherein said organic material is a natural material.

32. The apparatus according to claim 31, wherein said natural material is cellulosic.

33. The apparatus according to claim 21, wherein said supply of material having discrete elements is a non-conductive material.

34. The apparatus according to claim 33, wherein said supply of non-conductive material is a thermally non-conductive material.

35. The apparatus according to claim 33, wherein said supply of non-conductive material is an acoustically non-conductive material.

36. The apparatus according to claim 33, wherein said supply of non-conductive material is an electrically non-conductive material.

37. The apparatus according to claim 21, wherein said orifice substantially adjacent to the inlet of said blower for receiving the supply material having discrete elements is generally oval with its major axis substantially axially aligned.

38. The apparatus according to claim 21, wherein said inline blower is a vertical feed blower.

39. The apparatus according to claim 21, wherein said inline blower includes: a motor having a motor shaft extending through said motor; an impeller connected to one end of said motor shaft; and said transmission is connected between the other end of said motor shaft and said material agitator.

40. The apparatus according to claim 39, wherein the speed of said motor can be maintained at greater than about 1500 rpm.

41. The apparatus according to claim 39, wherein said impeller includes between about 3 and about 16 vanes.

42. The apparatus according to claim 21, wherein the gap between the concentric rings is spaced to prevent material that is too large from passing into the next zone.

43. The apparatus according to claim 21, wherein said material agitator further includes a base and a feed hopper attached to said base for receiving the material having discrete elements.

44. The apparatus according to claim 43, wherein said feed hopper for receiving the material having discrete elements is removable from said base.

45. The apparatus according to claim 44, wherein said feed hopper further includes a proximity sensor for detecting the location of said feed hopper and providing a warning signal if the feed hopper is detached from said bases.

46. The apparatus according to claim 45, wherein said proximity sensor is positioned on the outer surface of said feed hopper.

47. The apparatus according to claim 43, wherein said feed hopper further includes a breaker bar extending into said feed hopper.

48. The apparatus according to claim 47, wherein said breaker bar further includes a plurality of breaker bar vanes.

49. The apparatus according to claim 47, wherein the feed hopper includes a plurality of spring loaded, roller bars located between the breaker bar and the concentric rings for assisting in opening the material having discrete elements.

50. The apparatus according to claim 43, wherein said feed hopper further includes a shelf adjacent to its distal opening.

51. The apparatus according to claim 21, wherein the speed of said material agitator is less than about 100 rpm.

52. The apparatus according to claim 21, wherein said agitator further includes a plurality of sweeper bars for sweeping material into the conduit.

53. The apparatus according to claim 21, further including at least one air induction orifice adjacent to the inlet for the material having discrete elements of said high speed, inline blower for providing a minimum air flow to reduce plugging.

54. The apparatus according to claim 21, wherein said transmission connected to the shaft of said blower for providing a lower speed mechanical output to said material agitator is connected by a belt drive.

55. The apparatus according to claim 54, wherein said transmission includes a low mass, balanced sprocket having between about 3 and about 16 fan type blades to improve airflow and motor/transmission cooling attached to the input of said transmission for reducing vibration and wear.

56. The apparatus according to claim 54, wherein the axis of rotation of said transmission connected to the shaft of said blower and the axis of rotation of the shaft of said blower lie substantially in a plane and wherein the motor brushes of said blower are oriented substantially perpendicular to said plane.

* * * * *

UNITED STATES PATENT AND TRADEMARK OFFICE
CERTIFICATE OF CORRECTION

| | | |
|---|---|---|
| PATENT NO. | : 7,568,642 B2 | Page 1 of 1 |
| APPLICATION NO. | : 11/402309 | |
| DATED | : August 4, 2009 | |
| INVENTOR(S) | : Bowman et al. | |

It is certified that error appears in the above-identified patent and that said Letters Patent is hereby corrected as shown below:

In Column 4, Line 48, Feed Hopped should read Feed Hopper

In Column 6, Line 61, Throughput should read Through Put

Signed and Sealed this

Twenty-second Day of September, 2009

David J. Kappos
*Director of the United States Patent and Trademark Office*